June 20, 1950 W. L. L. VIVIE 2,512,262
RECORD EXCHANGER FOR AUTOMATIC GRAMOPHONES
Filed Feb. 5, 1947
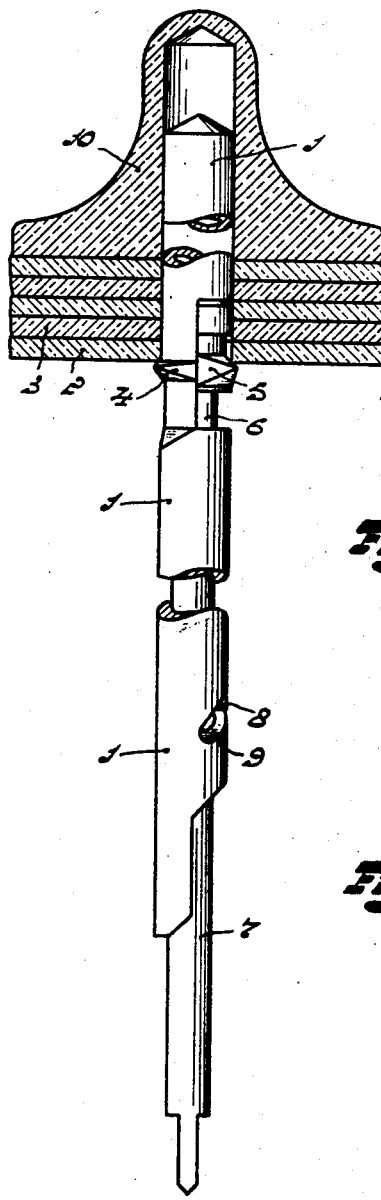
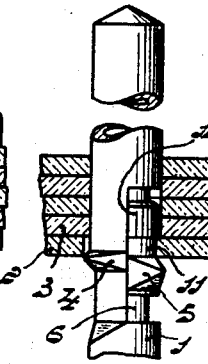
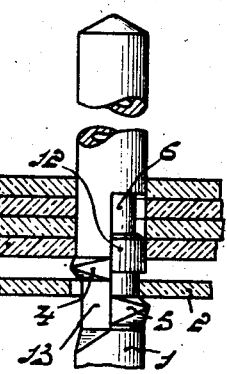
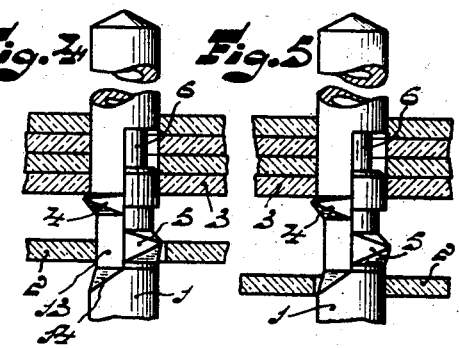
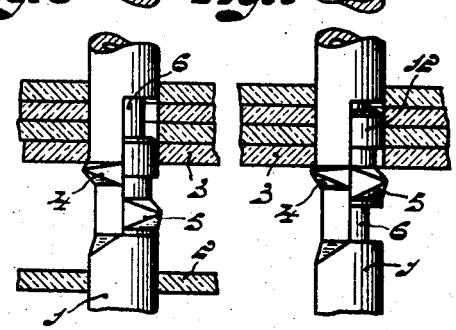
INVENTOR
W. L. L. VIVIE
BY
AGENT Patented June 20, 1950

2,512,262

UNITED STATES PATENT OFFICE 2,512,262

RECORD EXCHANGER FOR AUTOMATIC GRAMOPHONES

Wilhelmus Lambertus Leonardus Vivie, Eindhoven, Netherlands, assignor to Hartford National Bank and Trust Company, Hartford, Conn., as trustee Application February 5, 1947, Serial No. 726,654
In the Netherlands March 17, 1944

Section 1, Public Law 690, August 8, 1946
Patent expires March 17, 1964

4 Claims. (Cl. 274—10)

This invention relates to a record exchanger for automatic phonographs, the records being located over the turntable and being brought one by one to the turntable.

Record exchangers of this kind are known, in which the records on a spindle member passing through the central apertures of the records are supported by means of cams or other projecting parts provided on the spindle. By causing these said projections to move to the interior of the spindle, the records can successively pass the projections and are thus brought to the turntable.

Such record exchangers frequently involve the objection that the records are damaged in coming down on the projecting parts when this movement, as usual, is effected with a shock, said damage causing the central apertures of the records to be crumbled off at their edges.

The present invention purports to ensure that any damage to the records during the exchange is avoided, which is achieved by providing means so that the records slide evenly from one projection to the other without any shock occurring.

The record exchanger according to the invention exhibits the characteristic that two cams and a sliding surface are present, one cam being immovably secured to the spindle member and the other cam, which is diametrically opposite the said former cam prior to the exchange of the records, being movable up and down by means of a shaft member extending through the spindle. When the latter cam goes down, a recess in the spindle member facing the fixed cam becomes free, as a consequence of which the undermost record plate can slide downwards via the fixed cam in a slanting lateral direction and subsequently passes the movable cam at the height of a second recess of the spindle and, at last, moves via the said sliding surface and along the spindle member to the turntable. In this case the other records are prevented from passing the fixed cam by means of a lock following the movement of the movable cam, so that after the latter has gone up the initial position is reached again.

In order that the invention may be clearly understood and readily carried into effect, it will be described more fully by reference to the accompanying drawing.

Fig. 1 shows the principal parts of the record exchanger according to the invention.

Figs. 2 to 7 inclusive give in detail the different stages in letting down the undermost record.

In Fig. 1, reference 1 designates the spindle passing through the central apertures of the records 2, 3, etc. The lowermost record 2 bears on the cams 4 and 5 having inclined surfaces of sliding. The cam 4 is immovably connected to the spindle 1. The cam 5 is secured to a shaft member 6 which can move up and down and which extends through the spindle. The up and down movement of this shaft may be effected by a second shaft 7 in line with and contacting the shaft 6. By rotating the shaft 7 through an angle of 60° a pin 8 thereof is made to ride in the inclined groove 9 and thereby moves the shaft along its longitudinal axis. The levelkeeper 10 serves to keep the stack of records level.

In Fig. 2 the cam 5 is slightly lowered, so that the undermost record can slide into the recess 11 provided in the spindle over this cam, thus performing a lateral movement. Consequently, the record 2 can slide over the cam 4. The next record is prevented by the lock 12 from carrying out the same movement (see also Fig. 3).

From Fig. 3 it can be seen how by further lowering the cam 5 the record 2 has passed the cam 4 and now, by means of a recess 13 provided in the spindle, is enabled to perform a lateral movement to the right and thus to pass also the cam 5, as it appears further from Fig. 4. Subsequently, the record slides via the sliding surface 14, as is shown in Fig. 5, along the spindle further downwards to the turntable (see further Fig. 6).

At last, Fig. 7 shows how the shaft 6, together with the cam 5, is raised during which operation the lock 12 also is raised so that the initial position is reached again.

What I claim is:

1. Record exchanging apparatus for an automatic phonograph, comprising a substantially vertically arranged spindle bearing member having a cammed portion near the upper end thereof and being provided with an aperture and further provided with a slot having an axis arranged at an angle to a plane normal to the axis of the spindle member, a shaft member assembly movably extending within said spindle member and comprising a first shaft portion and a second shaft portion, said first shaft portion being provided with an enlarged end portion and a cammed portion extending through said spindle member aperture so as to be diametrically opposite the said cammed spindle portion to cooperate therewith to hold a stack of records aligned on said spindle member against downward movement, said second shaft portion being movably extending into said spindle member and drive coupled to the said first shaft portion, coupling means attached to the said second shaft portion and extending into the said spindle member slot to cause axial movement of the said second shaft portion when rotated thereby to axially move the said first shaft portion therewith so that the said cammed portion of the said first shaft portion will be moved to and from the said record holding position, said shaft cammed portion when moved downward from its said holding position releasing the undermost record of the said stack, said released record sliding downwardly along the surface of the said spindle cammed portion, thence downwardly along the surface of the said first shaft cammed portion and finally downwardly along the said spindle member, the record adjacent the said undermost record being locked against downward movement by the said enlarged end portion.

2. A record changing apparatus for an automatic phonograph, comprising a substantially vertically arranged spindle bearing member having a cammed portion near the upper end thereof and being provided with an aperture and further provided with a slot having an axis arranged at an angle to a plane normal to the axis of the spindle member, a shaft member assembly movably extending within said spindle member and comprising a first shaft portion and a second shaft portion, said first shaft portion being provided with an enlarged end portion and a cammed portion extending through said spindle member aperture so as to be diametrically opposite the said cammed spindle portion to cooperate therewith to hold a stack of records aligned on said spindle member against downward movement by engaging the bottom edge of the centering aperture of the undermost record, said second shaft portion being movably extending into said spindle member and drive coupled to the said first shaft portion, coupling means attached to the said second shaft portion and extending into the spindle member slot to cause axial movement of the said second shaft portion when rotated thereby to axially move the said first shaft portion and its cammed portion to and from the said record holding position, said shaft cammed portion when moved downward from its said holding position releasing the undermost record of the said stack as the adjacent record is locked against downward movement by the said enlarged end portion, and a keeper member for holding the said stack of records level.

3. Record changing apparatus for an automatic phonograph, comprising an upstanding fixed spindle bearing member provided with a cammed portion having a downwardly extending slide surface and being further provided with an aperture and a slot having an axis arranged at an angle to a plane normal to the axis of the spindle member, a first shaft member movably extending within the said spindle member and provided with an enlarged end portion and a cammed portion having a downwardly extending slide surface and protruding through said spindle member aperture so as to be positioned diametrically opposite the said cammed spindle member portion to cooperate therewith to hold a stack of records against downward movement along the said spindle member, a second shaft member movably extending into the said spindle member and drive coupled to the said first shaft member, coupling means attached to the said second shaft member and extending into the spindle slot to cause axial movement of the said second shaft member when rotated thereby to axially move the said first shaft member and its said cammed portion to and from the said record holding position, said shaft cammed portion when moved downward from its said holding position releasing the undermost record of the said stack, said released record sliding downwardly along the said surface of the said spindle cammed portion, thence downwardly along the said surface of the said first shaft cammed portion and finally downwardly along the said spindle member.

4. Record changer apparatus for an automatic phonograph, comprising a record supporting spindle member having a first portion provided with an aperture and a second portion provided with a slot having an axis arranged at an angle to a plane normal to the axis of the spindle member, a pair of axially aligned drive coupled shaft members extending through said spindle member for relative movement thereto, one of said shaft members having an enlarged end portion and the other said shaft member having a projecting element attached thereto and extending into the said slotted portion of the said spindle member, a pair of cammed members, a first of the said cammed members secured to the said spindle member opposite the said apertured portion and provided with a downwardly extending slide surface, the second of the said cammed members being attached to the shaft member with the enlarged end portion and projecting through the said apertured portion so as to be diametrically opposite the said first cammed member, said second cammed member being provided with a downwardly extending slide surface, said slide surfaces normally cooperating to hold a stack of records against downward movement along the said spindle member, said shaft member cammed portion being moved from and to the said holding position by a rotation of the said spindle connected shaft, the said cammed shaft portion when moved downward from its holding position releasing the undermost record of the said stack, said released record sliding downward along the said surface of said cammed spindle portion, thence downwardly along the said surface of the said cammed shaft portion and thereafter downwardly along the said spindle member.

WILHELMUS LAMBERTUS
LEONARDUS VIVIE.

REFERENCES CITED

The following references are of record in the file of this patent:

UNITED STATES PATENTS

| Number | Name | Date |
|---|---|---|
| 2,286,490 | Knox | June 16, 1942 |
| 2,287,098 | Habegger | June 23, 1942 |